United States Patent Office 2,718,007
Patented Sept. 20, 1955

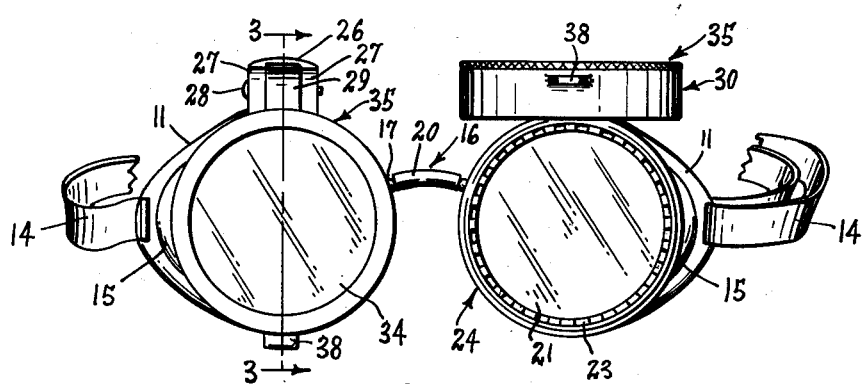
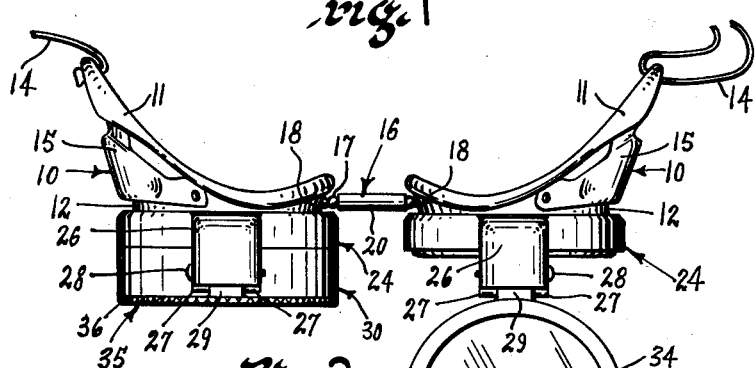
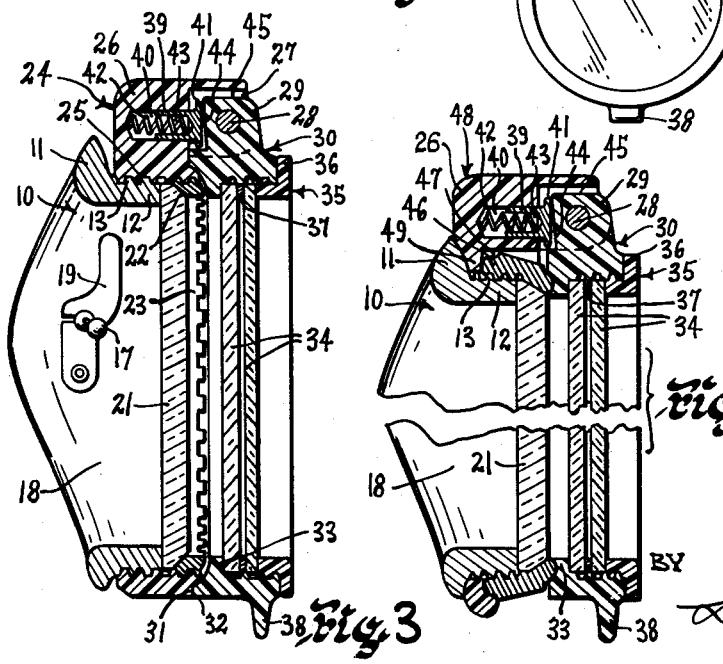

2,718,007

EYE PROTECTIVE DEVICES

George H. Schauweker, Southbridge, Mass., assignor to American Optical Company, Southbridge, Mass., a voluntary association of Massachusetts Application October 28, 1952, Serial No. 317,245

12 Claims. (Cl. 2—14)

This invention relates to improvements in eye protective devices and has particular reference to goggles having combinations of lenses movable into and out of the field of vision of a wearer.

One of the principal objects of this invention is to provide a pair of goggle eyecups with a lens holding unit embodying two annular hinged lens holding devices which are pivotally moveable into and out of superimposed relation, one of said annular devices being mounted upon a respective eyecup and retaining a respective eye protective lens in position over the opening in the eyecup and the other annular device supporting one or more light altering lenses moveable therewith into and out of the field of vision of a wearer.

Another object is to provide an eye protective device of the above character wherein the lens holding units which carry the light altering and eye protective lenses may be quickly and easily interchanged with conventional lens holding devices which support eye protective lenses in a conventional manner.

Another object is to provide an eye protective device of the above character wherein the lens holding units which are mounted on the respective eyecups each embody means for locking the unit in desired adjusted position on the eyecup whereby the units may be independently adjusted to permit relative alignment thereof as desired.

Another object is to provide an eye protective device of the above character wherein two annular lens holding devices comprising each lens holding unit are connected together by hinge means embodying a spring-actuated device for yieldably retaining the annular device in selected spaced or superimposed relation.

Another object is to provide eye protective means of the above character which is simple in its construction, efficient in its use and neat in appearance.

Other objects and advantages of the invention will become apparent from the following description taken in connection with the accompanying drawing, in which:

Fig. 1 is a front elevational view of an eye protective device embodying the invention;

Fig. 2 is a top plan view of the device shown in Fig. 1;

Fig. 3 is an enlarged vertical sectional view taken substantially on line 3—3 of Fig. 1 looking in the direction of the arrows; and Fig. 4 is an enlarged vertical sectional view generally similar to Fig. 3 illustrating a modification of the device.

Eye protective devices such as goggles are especially useful when they can be used for various purposes requiring quick change as, for example, from clear vision protection to protection from bright illumination such as is existent in the welding profession. Prior art teaches the use of goggles or other eye protective devices which embody lenses suitable for limited use only and also devices which are constructed and arranged with combinations of lenses movable into and out of the field of vision of a wearer. In the latter instance the lens supporting portions of the devices generally form a relatively inseparable part of each device, thus requiring the devices to be marketed as complete units.

The present invention, however, is directed to the provision of conventional goggles having replaceable and interchangeable lens holding units mounted thereon, which units can be adjusted with respect to one another and which embody novel spring-actuated means for retaining the respective lens-supporting portions thereof in selected spaced or superimposed relation.

Referring more particularly to the drawing, wherein like characters of reference designate like parts throughout the several views, the preferred embodiment of the invention comprises an eye protective device embodying a pair of spaced eyecups 10 each of which is formed with a face-engaging rear edge 11 shaped to the general contour of the eye-encircling portions of the face and an annular frontal portion 12 having threads 13 formed on its exterior surface.

The eyecups 10 have a suitable headband 14 secured thereto in a conventional manner to hold the device in position on the face of the wearer, and a shield 15 is secured in spaced overlying relation to an opening in the outer side of each eyecup 10 to provide necessary ventilation while preventing foreign matter from entering the openings.

The eyecups 10 are connected centrally by a bridge member 16 which, in the example illustrated, comprises an elongated ball-link or chain device 17 which is connected adjacent each end to the nasal portion 18 of the respective eyecups 10. The ends of the bridge member 16 preferably extend through openings in the respective nasal portions 18 and are each engaged by a pivotal latch 19 (Fig. 3) which prevents retraction thereof. The ball-link device 17 is preferably covered with a tubular piece of resilient material 20 for comfort when the bridge engages the nose of the wearer.

In the preferred form of the present invention, a clear lens 21 of safety glass, plastic or the like is preferably disposed over the end of the annular frontal portion 12. The lens 21 is provided throughout its periphery on one side thereof with a bevel 22 (Fig. 3) which is adapted to be engaged by a similar bevel formed on an annular locking member 23 which is threadedly secured within a frame-supporting ring 24. The ring 24 is of substantial width and threads 25 are provided throughout its inner surface, with the locking member 23 normally being located in the threads 25 adjacent the front side of the device, thus leaving a sufficiently large threaded area by which the ring 24 is connected with the threads 13 on the frontal portion 12 of the eyecup 10. The ring 24 thus may be threaded onto the frontal portions 12 of the eyecup 10 to the desired extent and the locking member 23, in being subsequently threaded into the ring 24 and into engagement with the bevel 22 on the lens 21 will cause the sides of the threads formed in the threaded portions of the frontal portion 12 and ring 24 to forcefully frictionally engage each other to wedge the ring 24 firmly in adjusted position. The locking member 23 simultaneously retains the lens 21 in position against the end of the frontal portion 12 due to its engagement with the bevel 22.

The ring 24 is provided with an outer extension 26 which is provided with a pair of integral spaced forwardly extending hinge ears 27. A hinge pin 28 connects the ears 27 and pivotally carries a hinge ear 29 which extends outwardly of an annular frame 30 which is of a size and shape to nest neatly upon the outer side of the ring 24. The frame 30 thus can be swung outwardly away from the ring 24 about the hinge pin 28 or can be closely superimposed upon the ring 24. The front surface of the ring 24 is provided with an annular groove 31 (Fig. 3) which is adapted to receive an annular flange or rim 32 formed on the rear surface of the frame 30 so that the ring 24 and frame 30 can be easily nested.

The frame 30 is provided with an inner annular flange 33 upon which one or more light-altering lenses 34 are adapted to rest. The lenses 34 may be formed of clear or colored glass or plastic and may possess ultra-violet or infra-red ray absorbing characteristics such as would be useful for use in welding. The lenses 34 are retained in position by means of a retaining ring 35 which is threaded into the annular frame 30 and which is provided on its outer periphery with a knurled flange 36 whereby it may be easily manually threaded into and out of engagement with the outer of the lenses 34. The lenses 34 are preferably spaced apart by thin annular rings 37 of resilient material to aid in preventing possible breakage of lenses when the retaining ring 35 is tightened.

With such a construction, it is apparent that an individual can wear a device of the presently described type with the frame 30 superimposed upon ring 24 whereupon objects can be viewed through all the lenses 21 and 34, or the wearer, by grasping the short extension 38 formed on the frame 30 in diametrically opposed relation to the hinge ear 29, can swing the frame 30 outwardly on hinge pin 28 whereupon only the lens 21 is in the field of vision of the wearer.

The frame 30 is retained in open or closed position by means of a spring actuated plunger 39 which is positioned within a recess 40 in the extension 26 of rear frame 24. The plunger 39 has a head 41 thereon which is adapted to engage the hinge ear 29, and is urged toward the ear 29 by a spring 42 which is located with one end engaging the end of the bore 40 and the other end positioned in a recess 43 in the plunger 39. The hinge ear 29 is provided with two flat bearing surfaces 44 and 45 one of which is located so as to to be engaged by the plunger 39 when the frame 30 is closed and the other of which is located so as to be engaged by the plunger when the frame 30 is raised. Thus, movement of the frame 30 between the respective open and closed positions will be accomplished against the inherent tension of the spring 42 which tends to urge the frame 30 either into closed or open position depending upon which bearing surface 44—45 is engaged by the head 41 of the plunger 39.

In attaching a lens unit to an eyecup, the ring 24 is preferably initially threaded onto the frontal portion 12 until it is located in substantially the desired position. Then the locking member 23 is tightened, thus binding the threads on the ring 24 with the threads on the frontal portion 12 and also holding the lens 21 securely in place. In this way the rings 24 on the respective eyecups 10 can be aligned with respect to one another, to position the hinges at the top of each eyecup, and locked in aligned position, thus presenting a neat and attractive appearance.

Although the ring 24 has been described as being threaded onto the frontal portion 12 of the eyecup, the devices can also be constructed as shown in Fig. 4 wherein a member 48 carrying the extension 26 is provided with an inner annular flange 49, thus forming an annular recess or groove 47 therein in which the annular locking member 46 is located. The locking member 46 is provided on its inner surface with threads and is itself threadedly attached to the frontal portion 12 of the eyecup 10. Thus, when the frame 30 is raised, the locking member 46 can be manually threaded onto the frontal portion 12, wedging the flange portion 49 of the member 48 firmly against the flange-like face-engaging edge 11 of the eyecup and simultaneously holding the lens 21 in proper seated relation with the frontal portion 12.

It is apparent from the foregoing description that a lens unit embodying a combination of lens elements can be attached to conventional goggles or other similar eye protective devices by simply removing the conventional lens-holding frame and substituting therefor a combination lens unit formed in accordance with the teachings of this invention. In this way the eye protective devices may be used for purposes which normally require the use of several lens combinations and yet may be easily and quickly reconverted for use in the conventional manner as desired.

From the foregoing description, it will be apparent that all of the objects and advantages of the invention have been accomplished. However, it will also be apparent that many changes may be made in the arrangement of parts shown and described without departing from the spirit of the invention. Therefore, it is to be understood that all matter shown or described is to be interpreted as illustrative and not in a limiting sense.

I claim:

1. A device of the character described adapted to be worn over the eyes of an individual comprising a pair of eyecups each shaped to have an annular frontal portion having an exteriorly threaded surface, an annular supporting member threadedly mounted on said frontal portion, locking means connected with said supporting member and overlying the end surface of the frontal portion for retaining a lens in position over the end of said frontal portion and in the visual field of a wearer and for simultaneously locking said supporting member in desired position on said frontal portion, and an annular lens-carrying frame hingedly attached to said supporting member for pivotal movement into and out of superimposed relation with said supporting member whereby lenses carried by said frame will be moved into and out of the field of vision of a wearer.

2. A device of the character described adapted to be worn over the eyes of an individual comprising a pair of eyecups each shaped to have an annular frontal portion having an exteriorly threaded side wall surface, an annular supporting member surrounding said side wall surface of said frontal portion and threadedly connected therewith, a lens resting on the end of said frontal portion, and locking means connected with said supporting member for retaining said lens in position over the end of said frontal portion and in the visual field of a wearer and for simultaneously locking said supporting member in desired position on said frontal portion, an annular lens-carrying frame hingedly attached to said supporting member for pivotal movement into and out of superimposed relation with said supporting member whereby lenses carried by said frame will be moved into and out of the field of vision of a wearer, a seat on said supporting member for receiving said lens-carrying frame and spring actuated means connected with said supporting member and engaging said frame for retaining said frame in said seat on said supporting member.

3. A device of the character described adapted to be worn over the eyes of an individual comprising a pair of eyecups each shaped to have an annular frontal portion having an exteriorly threaded surface, an annular supporting member having its interior wall threadedly mounted on said frontal portion, locking means threadedly connected with said interior wall of the supporting member for retaining a lens in position over the end of said frontal portion and in the visual field of a wearer, said locking means simultaneously effecting a binding of said supporting member on said frontal portion, an annular lens-carrying frame hingedly attached to said supporting member for pivotal movement into and out of superimposed fitting relation with a shaped edge of said supporting member whereby lenses carried by said frame will be moved into and out of the field of vision of a wearer, and spring-actuated means connected with said supporting member and engaging said frame for retaining said frame in desired adjusted positions relative to said supporting member.

4. A device of the character described adapted to be worn over the eyes of an individual comprising a pair of eyecups each shaped to have an annular frontal portion having an exteriorly threaded surface, an annular supporting member loosely mounted in encircling relation with said frontal portion, locking means threadedly mounted on said frontal portion for retaining a lens in position over the end of said frontal portion and in the visual field of a wearer and for simultaneously wedging said supporting member in desired position upon said frontal portion, and an annular lens-carrying frame hingedly attached to said supporting member for pivotal movement into and out of superimposed relation with said supporting member whereby lenses carried by said frame will be moved into and out of the field of vision of a wearer, and spring-actuated means connected with said supporting member and engaging said frame for retaining said frame in desired adjusted position relative to said supporting member.

5. In a device of the character described, a combination lens unit for attachment to an eyecup of a goggle comprising an annular supporting member shaped to be removably mounted on the front of said eyecup, locking means connected with said supporting member for retaining a lens in position over the end of said eyecup and in the visual field of a wearer, said supporting member having a convexly shaped outer edge, and an annular lens-carrying frame hingedly attached to said supporting member for pivotal movement into and out of superimposed fitted relation with the shaped outer edge of said supporting member whereby lenses carried by said frame will be moved into and out of the field of vision of the wearer, and spring-actuated means connected with said supporting member and engaging said frame for retaining said frame in desired adjusted position relative to said supporting member.

6. An eyecup having an exteriorly threaded annular portion, an auxiliary lens-supporting assembly carried by said eyecup and comprising inner and outer annular members hingedly connected with each other adjacent a common side thereof whereby one of said annular members may be swung outwardly with respect to the other or inwardly to position said annular members in aligned superimposed relation with each other, lens means carried by said outer annular member, said inner annular member having a portion dimensioned to fit in overlying relation with the exteriorly threaded annular portion of the eyecup, said eyecup and said inner annular member having portions with side surfaces for engagement with each other, and retaining means located between said outer annular member and the adjacent end of the eyecup for retaining said inner annular member in assembled relation with said eyecup, said retaining means being adjustable to a position whereby said side surface portions will be moved into frictional binding relation with each other.

7. An eyecup having an exteriorly threaded annular portion, an auxiliary lens-supporting assembly carried by said eyecup and comprising two annular members hingedly connected with each other adjacent a common side thereof whereby one of said annular members may be swung outwardly with respect to the other or inwardly to position said annular members in aligned superimposed relation with each other, lens means carried by said outer annular member, an eye protective lens carried by said inner annular member, said inner annular member having a portion dimensioned to fit in overlying relation with the exteriorly threaded annular portion of the eyecup, said eyecup and said inner annular member having portions with side surfaces for engagement with each other, and retaining means located between said outer annular member and the adjacent end of the eyecup for simultaneously retaining said annular member and said eye protective lens in assembled relation with said eyecup, said retaining means being adjustable to a position whereby said side surface portions will be moved into frictional binding relation with each other.

8. An eyecup having an exteriorly threaded annular portion, an auxiliary lens-supporting assembly carried by said eyecup and comprising inner and outer annular members hingedly connected with each other adjacent a common side thereof whereby said outer annular member may be swung outwardly with respect to the inner annular member or inwardly to position said annular members in aligned superimposed relation with each other, lens means carried by said outer annular member, the inner annular member having a portion dimensioned to fit in overlying relation with the exteriorly threaded annular portion of the eyecup, said eyecup and said inner annular member having portions with side surfaces for engagement with each other, retaining means located between said outer annular member and the adjacent end of the eyecup for retaining said inner annular member in assembled relation with said eyecup, said retaining means being adjustable to a position whereby said side surface portions will be moved into frictional binding relation with each other, and spring actuated means connected with said inner annular member and engaging said outer annular member for retaining said outer annular member in desired adjusted position with respect to said inner annular member.

9. An assembly embodying an eyecup member and auxiliary lens-supporting means each having an annular portion, said annular portions being in overlying relation with each other, one of said annular portions having a threaded area, retaining means for retaining a lens in assembled relation with said eyecup member, said retaining means having a threaded portion in threaded relation with said threaded area, said retaining means further functioning as binding means to retain said annular portion of said auxiliary lens supporting means in desired positional relation with the annular portion of the eyecup member and said auxiliary lens-supporting means further embodying an outer lens retaining ring carrying auxiliary lens means and having a portion pivotally connected with said annular portion of said auxiliary lens-supporting means whereby the auxiliary lens means may be swung into and out of aligned relation with the eyecup.

10. An assembly embodying an eyecup member and auxiliary lens-supporting means each having an annular portion, said annular portions being in overlying relation with each other, one of said annular portions having a threaded area, retaining means for retaining a lens in assembled relation with said eyecup member, said retaining means having a threaded portion in threaded relation with said threaded area, said retaining means further functioning as binding means to retain said annular portion of said auxiliary lens-supporting means in desired positional relation with the annular portion of the eyecup member and said auxiliary lens-supporting means further embodying an outer lens retaining ring carrying auxiliary lens means and having a portion pivotally connected with said annular portion of said auxiliary lens-supporting means whereby the auxiliary lens means may be swung into and out of aligned relation with the eyecup, and spring actuated means connected with said annular portion of said auxiliary lens-supporting means and engaging said lens retaining ring for retaining said lens retaining ring in desired adjusted position.

11. In goggles, the combination of an eyecup embodying an annular-shaped wall having a lens resting on the end thereof and a secondary lens frame-supporting assembly encircling said wall and detachably connected therewith, said supporting assembly including a first member overlying the peripheral edge of the lens to hold it in place detachably connected with said wall, an extension carried by said supporting assembly and a secondary lens frame pivotally connected to said extension, said first member having a continuous recessed portion provided on the outer periphery of the forward end thereof, and said secondary lens-carrying frame having a peripheral portion shaped as a continuous flange to extend into said recessed portion and surround said forward end of the first member when said frame is pivoted to overlying relation therewith, and said extension and secondary lens frame having means adapted for urging said inner peripheral portion of the secondary lens-carrying frame into resilient binding close relation with said recessed portion of the first member, and said means further serving to hold the secondary lens-carrying frame in an open position when desired.

12. Goggles comprising a pair of eyecups having forwardly projecting and annular-shaped exteriorly threaded walls, a lens resting on the end of each wall, ring means encircling said wall and including a portion which overlies the peripheral edge of said lens, said ring means being threadedly interconnected with said exteriorly threaded wall to retain the lens in place, a housing carried by said ring means and having a pair of forwardly extending spaced ears, a lens-carrying frame including an ear portion disposed between said spaced ears and pivotally connected thereto, said ring means including an annular groove-like seat formed about the outer edge of the forward end of said ring means, the lens-carrying frame having a flange-like part for fitting in said seat when pivoted to overlying relation therewith, and spring-operated means for urging said flange-like part of the lens-carrying frame into resilient binding close engagement with the groove-like seat of the ring means, said spring-operated means further serving to hold the lens-carrying frame in open position when desired.

References Cited in the file of this patent

UNITED STATES PATENTS

| | | |
|---|---|---|
| 1,843,833 | Parsons | Feb. 2, 1932 |
| 2,355,015 | Splaine et al. | Aug. 1, 1944 |
| 2,411,224 | O'Reilly | Nov. 19, 1946 |

FOREIGN PATENTS

| | | |
|---|---|---|
| 217,348 | Switzerland | Feb. 2, 1942 |